Aug. 7, 1945.　　　D. B. WICKER ET AL　　　2,381,240
STAPLE FIBER CUTTER
Filed April 4, 1944
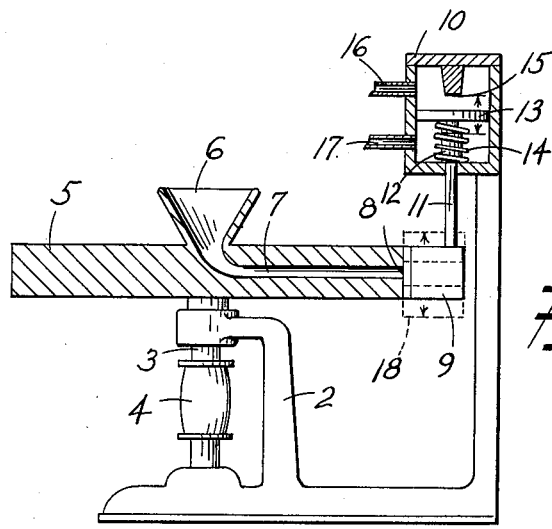
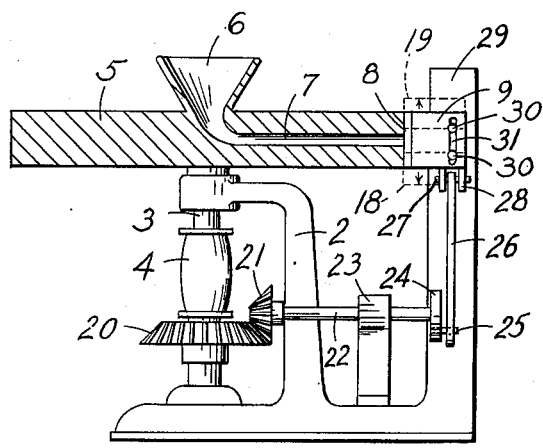
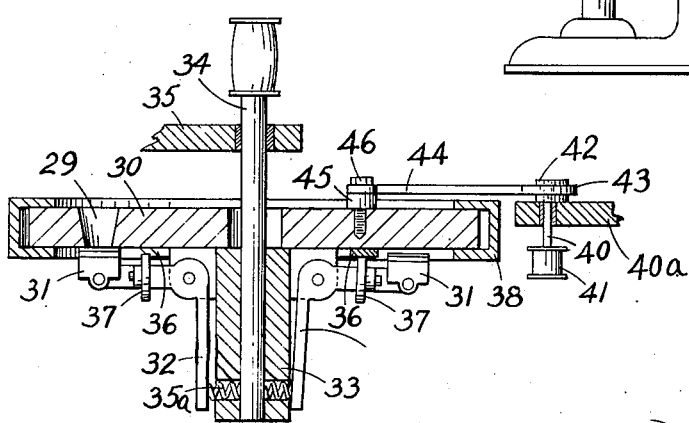
INVENTORS.
Dan B. Wicker
Charles W. Cox
BY Carl A. Castellan
ATTORNEY Patented Aug. 7, 1945

2,381,240

UNITED STATES PATENT OFFICE 2,381,240

STAPLE FIBER CUTTER

Dan B. Wicker, Dunbar, and Charles W. Cox, St. Albans, W. Va., assignors to American Viscose Corporation, Wilmington, Del., a corporation of Delaware Application April 4, 1944, Serial No. 529,539

14 Claims. (Cl. 164—34)

This invention relates to apparatus for cutting continuous filaments into discontinuous lengths. More particularly, the invention is concerned with improvements in staple fiber cutters of the type shown in Beria 1,723,998 and Blaschke 2,182,193. Such cutters comprise a shear member having a portion adapted to serve as a cutting base and at least one cutting member cooperating therewith, either one of the co-operating members being continuously moved relative to the other member to periodically or intermittently effect cutting of the filamentary material conducted into cutting position with respect thereto.

The principal disadvantage associated with staple fiber cutters of this type is that while the knife and shear member are maintained in the exact alignment in which they are originally set up, the knife repeatedly contacts the same points of the shear member surface with the result that a definite path of travel is worn therein and ridges and grooves are formed in the cutting edge of the knife which mate with corresponding ridges and grooves formed in the surface of the shear member. When, as invariably occurs during a cutting operation, the knife is inadvertently displaced even to a slight extent, the ridges and grooves in the respective members no longer match, and intimate contact between the members is lost, and under such conditions the filaments emerging from the opening in the shear member are not all cleanly cut, some of the filaments of the bundle or tow being merely pushed aside by the knife, or drawn under the cutting edge thereof and sheared into indeterminate diverse lengths or "tails." Such devices require frequent servicing and repair, in order to smooth down the contacting surfaces, with consequent loss of operating time.

The primary object of the present invention is to continually impart to either the cutting member or shear member an oscillating movement which is transverse to and out of phase with the relative movement by which cutting is effected, so that the members are constantly shifted. The extent of this oscillation is of limited amplitude, to ensure that at the periods of cutting the cutting member is not entirely removed from any portion of the effective cutting base portion of the shear member, and all of the filaments in the bundle are subjected to the action of the knife. The continual or frequently repeated out-of-phase sliding or shifting of the cutting edge of the knife over the surface of the shear member when the two are in contact causes even distribution of wear over both surfaces, and the occurrence of ridges and grooves therein is entirely avoided. Further, such oscillation has the result that a greater length of the cutting edge of the knife is utilized, and wear thereon is spread out over a greater proportion of the cutting edge surface, which greatly extends the life of the knife. The contacting surfaces are continuously automatically polished and smoothed down, and all of the filaments of the bundle being handled are cut cleanly. Continual oscillation of either the shear member or cutter knife as desired, may be obtained in any suitable manner.

In the drawing illustrative of the invention—

Figure 1 is an elevation partly in section, of one embodiment of the invention;

Figure 2 is an elevation, partly in section, of a modification of the invention; and Figure 3 is an elevation, partly in section, of still another embodiment of the invention.

The embodiments shown in Figures 1 and 2 illustrate the invention as adapted to a fiber cutter of the type disclosed in Beria 1,723,998, while Figure 3 illustrates the invention as applied to a cutter of the type shown by Blaschke 2,182,193.

In Figures 1 and 2 there is shown a device comprising a support 2 within which a shaft 3 is rotatably mounted. The shaft is provided with a sheave 4, by which it may be driven. The shear member is constituted by a disk 5 secured to one end of shaft 3 for rotation therewith. The shear member is provided with a funnel-like entrance 6 for the filamentary material, which is connected with radial passage 7 extending to the periphery of disk 5, as shown at 8. The periphery of the disk is in contact with cutter knife 9. A cylinder 10 is mounted on one arm of support 2, and is provided with a piston 13 having piston rod 11 attached to knife 9. The rod 11 has an enlarged portion 12 for limiting the downward movement of the piston within cylinder 10. A spring 14 has one of its ends secured to the cylinder end wall and the other end secured to piston rod 11, and tends to press the knife 9 against the disk 5. The cylinder is provided with a projection or knob 15 of resilient material, such as rubber, for limiting the upward movement of piston 13 and with inlets 16 and 17 connected with a hydraulic system by which air or other fluid may be introduced at intervals to the cylinder on alternate sides of the piston 13. In operation, knife 9 shifts within the limits shown by the dotted lines, so that the knife is maintained in cutting position, and some portion of the cutting edge thereof is always in contact with all of the filaments emerging from the disk.

Figure 2 illustrates a means of obtaining continuous reciprocal movement of the knife axially of the rotatable disk by mechanical means. In that embodiment, shaft 3 carries a bevel gear 20 which intermeshes with gear 21 mounted on one end of shaft 22 at right angles to shaft 3. Shaft 22 is supported by bearings 23 and supports at its other end a crank disk 24 carrying an eccentric pin 25 connected by the rod 26 and the pin 27 to a pair of ears secured to the shank of the knife 9 which is slidably mounted on a standard 29 by virtue of the cap screws 30 which extend through the slot 31 of the shank of the knife.

In both Figures 1 and 2, the oscillatory movement of the knife should be out of phase with respect to the rotative motion of the disk 5. For this purpose, the number of teeth on gear 20 must not be an integral multiple of those on gear 21.

The results obtained by means of the device illustrated in Figure 2 are the same as those achieved in the case of the device shown in Figure 1. In either case, knife 9 is continuously reciprocated axially of the rotating disk, in close contact with the periphery thereof, so that the surface of the disk and the cutting edge of the knife are equally and evenly worn, resulting in much longer usefulness of the knife and uninterrupted operation of the cutting device over longer periods of time. Staple fibers of substantially uniform predetermined length are cut from the bundle or tow of continuous filaments emerging from the disk without the occurrence of unevenly sheared ends, and with considerable economy of both time and equipment.

Although only one axially reciprocating knife is shown co-operating with the disk in Figures 1 and 2, the invention may be practiced with a device of the type disclosed in Bitler U. S. Patent No. 2,296,252. Thus, a multiplicity of knives may be employed, and they may be spaced at equal or unequal distances around the periphery of the disk to produce staple fibers of substantially uniform length or of non-uniform length, as desired.

Figure 3 shows a modification of the invention applied to the type of cutter shown in Blaschke 2,182,193. In that device, the filamentary material is fed downwardly through the opening 29 in a non-rotatable disk or shear member 30, whose lower surface in proximity to the opening serves as a cutting base in co-operation with the knives 31. The knives are carried upon bell-crank levers 32 pivotally mounted on a hub 33 carried on a shaft 34 for rotation therewith. Shaft 34 is supported by a stationary bearing 35. The arms of the bell-crank levers opposite the arms carrying the knives may be pressed outwardly from the shaft 34 by suitable springs 35a bearing against the shaft and housed in recesses within the hub 33. A cam ring 36 may be formed integrally with or attached upon the under surface of disk 30, the cam ring having a dwell in the form of a part omitted adjacent the opening 29 in disk 30. The arms of the bell crank levers carrying the knives are each provided with a follower 37, preferably in the form of a roller which is adapted to co-operate with the cam ring 36. In this manner, as the shaft rotates the member 33 carrying the knives 31, the cam ring 36 on the disk member 30 forces the follower 37 downwardly, thereby keeping the knives out of contact with the disk surface until they approach the opening 29 in member 30, through which the filamentary material emerges for cutting, and in which position, because of the dwell in the cam ring, the springs 35 are allowed to act to force the knives 31 into contact with member 30. In accordance with this invention, disk 30 is positioned for relative movement in a stationary bracket 38 heaving a guideway formed therein, to restrain the disk 30 to straight line motion in a direction lying in the plane of the drawing and is continually oscillated therein by means of a crank arrangement comprising a shaft 40 supported in bearing 40a, having a pulley 41 adapted to be driven by any suitable means (not shown) and having an eccentric 42 mounted on its opposite end. Eccentric 42 carries a loosely fitting strap 43 connected with lever 44, which latter is bossed at one end as at 45, and pivotally secured to disk 30 by the cap screw 46. The extent of the oscillating movement of the disk is so limited by the eccentric that the opening in the disk from which the filamentary bundle emerges is always juxtaposed to some portion of the cutting edge of the knife 31, when the latter is brought into cutting position by the rotating hub 33, and the oscillating movement is insufficient to interfere with uninterrupted delivery of the filamentary material through the opening 29. Such continuous substantially horizontal oscillation of disk 30 of limited amplitude ensures that the portion of the disk which contacts the cutting edge of knife 31 is constantly changed, when the two are juxtaposed in cutting position, the points of contact therebetween being different at all times during any given cutting operation, with the result that the knife and under surface of the disk are evenly and smoothly worn, and grooves and ridges are not formed therein.

While preferred embodiments of the invention have been disclosed, the description is intended to be illustrative only. Thus it will be understood that continuous oscillating movement of either the shear member or disk and the cutter knife, which is the essence of the invention, may be obtained by any suitable means, which may be pneumatically, hydraulically, or mechanically operated. It is to be understood that all such embodiments or modifications of the present disclosure may be made without departing from the spirit and scope of the invention as defined by the appended claims.

We claim:

1. In a device for cutting a filamentary bundle into discontinuous lengths comprising at least one cutting member, a shear member having a portion adapted to serve as a cutting base in co-operation with the cutting member, and means for moving at least one of said members to effect periodic juxtaposition of the cutting member with the cutting base portion of the shear member, the combination therewith of means for imparting to one of said members relative to the other during at least the periods of juxtaposition an additional oscillatory motion having a component transverse to the direction of and out of phase with the first-mentioned relative motion, said oscillatory motion having such limited amplitude that it in itself causes relative shifting between the cutting member and the cutting base portion of the shear member without entirely removing the cutting member from any portion of said cutting base portion.

2. In a device for cutting a filamentary bundle into discontinuous lengths comprising at least one cutting member, a shear member having a portion adapted to serve as a cutting base in co-operation with the cutting member, and means for rotating at least one of said members to effect periodic juxtaposition of the cutting member with the cutting base portion of the shear member, the combination therewith of means for imparting to one of said members relative to the other during at least the periods of juxtaposition an additional oscillatory motion having a component transverse to the direction of and out of phase with the first-mentioned relative rotary motion, said oscillatory motion having such limited amplitude that it in itself causes relative shifting between the cutting member and the cutting base portion of the shear member without entirely removing the cutting member from any portion of said cutting base portion.

3. In a device for cutting a filamentary bundle into discontinuous lengths comprising at least one cutting member, a shear member having a portion adapted to serve as a cutting base in co-operation with the cutting member, said shear member having a channel for feeding the filamentary material to the cutting base portion, means for rotating the shear member to effect periodic juxtaposition of the cutting member with the cutting base portion of the shear member, the combination therewith of means for imparting to one of said members relative to the other during at least the periods of juxtaposition an additional oscillatory motion having a component transverse to the direction of and out of phase with the first-mentioned relative motion, said oscillatory motion having such limited amplitude that it in itself causes relative shifting between the cutting member and the cutting base portion of the shear member without entirely removing the cutting member from any portion of said cutting base portion.

4. In a device for cutting a filamentary bundle into discontinuous lengths comprising at least one cutting member, a shear member having a portion adapted to serve as a cutting base in co-operation with the cutting member, said shear member having a channel for feeding the filamentary material to the cutting base portion, means for rotating the shear member to effect periodic juxtaposition of the cutting member with the cutting base portion of the shear member, the combination therewith of means for imparting to the cutting member a reciprocatory motion having a component transverse to the direction of and out of phase with relative rotation of the shear member with respect thereto, said reciprocatory motion having such limited amplitude that it in itself causes relative shifting between the cutting member and the cutting base portion of the shear member without entirely removing the cutting member from any portion of said cutting base portion.

5. In a device for cutting a filamentary bundle into discontinuous lengths comprising at least one cutting member, a shear member having a portion adapted to serve as a cutting base in co-operation with the cutting member, means for rotating the cutting member to effect periodic juxtaposition of the cutting member with the cutting base portion of the shear member, the combination therewith of means for imparting to one of said members relatively to the other during at least the periods of juxtaposition an additional oscillatory motion having a component transverse to the direction of and out of phase with the first-mentioned relative motion, said oscillatory motion having such limited amplitude that it in itself causes relative shifting between the cutting member and the cutting base portion of the shear member without entirely removing the cutting member from any portion of said cutting base portion.

6. In a device for cutting a filamentary bundle into discontinuous lengths comprising at least one cutting member, a shear member having a portion adapted to serve as a cutting base in co-operation with the cutting member, means for rotating the cutting member to effect periodic juxtaposition of the cutting member with the cutting base portion of the shear member, the combination therewith of means for imparting to the shear member an oscillatory motion having a component transverse to the direction of, and out of phase with, the relative rotation of the cutting member with respect thereto, said oscillatory motion having such limited amplitude that it in itself causes relative shifting between the cutting member and the cutting base portion of the shear member without entirely removing the cutting member from any portion of said cutting base portion.

7. In combination with a device for cutting a filamentary bundle into discontinuous lengths comprising at least one cutting member, a shear member having an opening therein for the passage of the filamentary bundle therethrough, and means for periodically aligning the cutting member and opening in the shear member in cutting position, and means for imparting continuous out-of-phase oscillation to one of said members in a limited path such that the same is maintained in cutting position during oscillation.

8. In combination with a device for cutting a filamentary bundle into discontinuous lengths comprising a rotatable member having an opening therein for the passage of the filamentary bundle therethrough and at least one cutting member co-operating with said rotatable member to intermittently intercept and cut the filamentary bundle emerging from said opening, means for continuously oscillating said cutting member axially of and out of phase with said rotatable member, and means for limiting the extent of oscillation of said cutting member so that the same is maintained in cutting position during oscillation.

9. Apparatus for cutting continuous filaments into discontinuous lengths comprising a rotatable member, a channel therethrough having a substantially radially extending passageway terminating in an opening in the outer peripheral surface of the rotatable member, at least one cutting member in contact with the outer peripheral surface, and means for rotating the rotatable member to periodically align the opening therein and the cutting member in cutting position, means for imparting continuous out-of-phase oscillation to the cutting member, and means for limiting the extent of oscillation thereof so that the cutting member is maintained in cutting position during oscillation.

10. Apparatus for cutting continuous filaments into discontinuous lengths comprising a rotatable disk, a channel therethrough having a substantially radially extending passageway terminating in an opening in the outer peripheral surface of the disk, at least one knife in contact with the outer peripheral surface, and means for rotating the disk to periodically align the opening therein and the knife in cutting position, means for imparting continuous out-of-phase oscillation of the knife axially of the disk, and means for limiting the extent of oscillation of the knife so that the same is maintained in cutting position during oscillation.

11. In combination with a device for cutting a filamentary bundle to discontinuous lengths comprising a non-rotatable shear member having an opening therein for the passage of the filamentary bundle therethrough and a rotatable support carrying a knife for co-operating with the shear member to intermittently intercept and cut the filamentary bundle emerging from the opening, means for continuously oscillating the shear member in a substantially horizontal path, and means for limiting the extent of oscillation of the shear member so that the opening therein is maintained in cutting position.

12. In combination with a device for cutting a filamentary bundle to discontinuous lengths comprising a non-rotatable shear member having an opening therein for the passage of the filamentary bundle therethrough, a rotatable support carrying a knife for co-operating with the shear member to intermittently intercept and cut the filamentary bundle emerging from the opening therein, means for rotating the support to periodically align the knife and opening in the shear member in cutting position, and means for separating the knife from contact with the shear member during a part of the period when the knife and opening in the shear member are out of alignment, means for continuously oscillating the shear member in a substantially horizontal path, and means for limiting the extent of oscillation of the shear member so that the opening therein is maintained in cutting position.

13. In combination with a device for cutting a filamentary bundle to discontinuous lengths comprising a non-rotatable disk having an opening therein for the passage of the filamentary bundle therethrough, at least one knife co-operating with the disk to intermittently intercept and cut the filamentary bundle emerging from the opening therein, a cam on the disk, a rotatable support for the knife carrying a follower, means for rotating the support to periodically align the knife and opening in the disk in cutting position, the cam and follower being arranged to take the knife out of contact with the disk during a part of the period when the knife and opening in the disk are out of alignment, means for continuously oscillating the disk in a substantially horizontal path, and means for limiting the extent of oscillation of the disk so that the opening therein is maintained in cutting position.

14. Apparatus for cutting continuous filaments into discontinuous lengths comprising a non-rotatable shear member having an opening therein for the passage of the filaments therethrough, a rotatable support carrying a knife for co-operating with the shear member to intermittently intercept and cut the filaments emerging from the opening, means for continuously oscillating the shear member in a substantially horizontal path, and means for limiting the extent of oscillation thereof so that the opening therein is maintained in cutting position.

DAN B. WICKER.
CHARLES W. COX.